(12) United States Patent  
Atkinson (10) Patent No.: US 7,582,999 B2  
(45) Date of Patent: Sep. 1, 2009

(54) ELECTRIC MACHINE HAVING A MAGNETICALLY INDUCIBLE CORE

(75) Inventor: Donald Alfred Atkinson, Hindmarsh (AU)

(73) Assignee: Intelligent Electric Motor Solutions Pty Ltd, Hindmarsh, South Australia (AU)

( * ) Notice: Subject to any disclaimer, the term of this patent is extended or adjusted under 35 U.S.C. 154(b) by 0 days.

(21) Appl. No.: 10/580,121

(22) PCT Filed: Nov. 19, 2004

(86) PCT No.: PCT/AU2004/001601

§ 371 (c)(1),  
(2), (4) Date: Mar. 30, 2007

(87) PCT Pub. No.: WO2005/050818

PCT Pub. Date: Jun. 2, 2005

(65) Prior Publication Data

US 2007/0273218 A1    Nov. 29, 2007

(30) Foreign Application Priority Data

Nov. 20, 2003 (AU) ............................... 2003906405

(51) Int. Cl.  
*H02K 1/00* (2006.01)

(52) U.S. Cl. ....................... 310/179; 310/45; 310/71; 439/74

(58) Field of Classification Search ......... 310/179–180, 310/201, 332, 71, 232, 45; 439/74, 65–66  
See application file for complete search history.

(56) References Cited

U.S. PATENT DOCUMENTS

| 3,252,027 A | 5/1966 | Korinek et al. |
| 4,115,915 A | 9/1978 | Godfrey |
| 4,398,112 A | 8/1983 | van Gils |

(Continued)

FOREIGN PATENT DOCUMENTS

| GB | 952752 | 3/1964 |
| GB | 1 291 989 | 10/1972 |
| GB | 2 397 179 | 7/2004 |

OTHER PUBLICATIONS

International Search Report for PCT/AU2004/001601 dated Feb. 17, 2005 (3 pages).  
Patent Abstracts of Japan 08-079999 dated Mar. 22, 1996 (6 pages).  
Patent Abstracts of Japan 06-245425 dated Sep. 2, 1994 (5 pages).  
Patent Abstracts of Japan 10-127028 dated May 15, 1998 (5 pages).

*Primary Examiner*—Michael C Zarroli  
(74) *Attorney, Agent, or Firm*—Osha • Liang LLP (57) ABSTRACT

An electric machine which includes a magnetically inducible core (60), at least three elongated first, second and third current carrying conductors (64-66) passing through a respective aperture (68) through the core, a first end (15, 69) of the first conductor and a first end of the second conductor are electrically connected by a first bridging member (8) located on a first side of the core, a second end of the second conductor and a second end of the third conductor are electrically connected by a second bridging member (8) located on a second side of the core (FIGS. 4, 5).

8 Claims, 6 Drawing Sheets

U.S. PATENT DOCUMENTS

| | | | |
|---|---|---|---|
| 5,712,517 A * | 1/1998 | Schmidt et al. | 310/45 |
| 5,773,905 A | 6/1998 | Hill | |
| 5,934,600 A * | 8/1999 | Darceot | 242/433 |
| 6,707,221 B2 * | 3/2004 | Carl | 310/254 |
| 6,817,870 B1 * | 11/2004 | Kwong et al. | 439/74 |
| 6,836,047 B1 * | 12/2004 | Leijon | 310/198 |
| 2003/0127935 A1 * | 7/2003 | Mori et al. | 310/206 |
| 2003/0137210 A1 * | 7/2003 | Southall et al. | 310/232 |

* cited by examiner

ELECTRIC MACHINE HAVING A MAGNETICALLY INDUCIBLE CORE

This invention relates to electric machines and in particular to a winding arrangement with respect to a core.

TECHNICAL FIELD

Electrical machines be these motors, generators or transformers currently conventionally use coils of electrically conductive wire wound around a magnetically inducible core to create or be affected by magnetic fields.

BACKGROUND ART

Winding of such coils has become a highly developed art but in so far that a coil is required there is a need therefore for a compatible shape of core to allow for the location of the wound coil around a portion of the core with it is hoped an efficient magnetic coupling. Further, in order to reduce eddy current loss's in a core, it is also conventional to laminate the core using a plurality of separate plates or laminations which are laid against one another with the alignment of each lamination being determined by the overall structure of the electric machine and where any magnetic fields induced therein are required to be directed. This required structure however which is to say wound coils and laminated cores currently determine the current conventional electric motor construction requirements.

DISCLOSURE OF THE INVENTION

I have discovered that there can be an alternative construction which I have found can provide alternative options for electric machine designers which does in at least some cases provide advantages over the current machines designed according to current techniques.

Other objects and advantages of the present invention will become apparent from the following description taken in connection with the accompanying drawings wherein by way of illustration and example an embodiment of the present invention is disclosed.

In one form of this invention there is proposed an electric machine which includes a magnetically inducible core and at least two elongated electrical current conductors passing through for each a respective aperture through the core with a first end of the first conductor being at a first side of the core and a first end of the second conductor being at the same said first side of the core, and the two respective first ends being electrically connected together by a bridging member.

In preference a second end of the second conductor is at a second side of the core and a first end of a third conductor is at the first side of the core, and a second end of the third conductors at the second side of the core, the two respective second ends being electrically connected together by a bridging member.

In preference there are a plurality of elongate electrical current conductors passing through for each a respective aperture through the core with a first end of a each conductor being at a first side of the core and a second end of each conductor being at a second side of the core, wherein each bridging member is adapted to electrically connect the plurality of conductors in pairs such that a single continuous electrically conductive path is formed, running through the core though a plurality of bores.

In preference the bridging member is a printed circuit board.

In preference the printed circuit board track is flat.

This then can be can be significantly shorter than end-windings of a coil which would otherwise form a bridging function.

In preference the core is comprised of a soft magnetic composite material.

In preference the core is comprised of high resistance bonded iron.

In preference each of the said elongated electrical conductors is a physically straight member that is located within a correspondingly straight bore through the core.

In preference each of the electrical current conductors has an electrically insulating coating located so as to extend around its outer side at least where it is in an adjacent or adjoining relationship with the inner surface of the bore through which it is located.

In preference the insulation is an enamel coating.

In preference each of the elongate electrical current conductors is located within a bore passing fully through the core and is of a matching cross-sectional shape and size such that the inner dimensions of the bore are close to external dimensions of the outer surface of the elongate electrical conductor. A close fit of the wire in the bore assists in effecting a dose coupling in a magnetic sense between the current conductor and the core material.

In preference the bore is coated with an insulating lacquer.

It also can be of assistance to effect heat conduction between the conductor and the core, allowing heat build-up from "copper" losses in the conductor to be transmitted to the core which can act to dissipate the heat. Additional cooling means may also be used.

In preference there are at least four elongate electrical current conductors passing through each a respective bore that is to say one bore for each one of the conductors and there are two separate bridging members at a one end of the core where a first two of the conductors are connected electrically together by a said first of the bridging members and a said second two of the conductors are connected together electrically by a second of the bridging members.

Such an arrangement allows for a multiple arrangement of conductors to be variously connected together for appropriate electrical couplings. For instance if there are to be two phases used in the electrical machine or three phases then each phase will be able to be separately connected using however the general principals described.

By using a technique such as that used in printed circuit boards typically which is to say that each separate wire has its end located within an aperture within the circuit board and then caused to adhered therein for instance by a solder or other acceptable electrically conducting joining, this allowing for efficiencies of electrical circuit boards and joining techniques to be used in this other discipline. It is also appropriate that the printed circuit board is arranged to have further electrical connections.

In preference the respective bores are each parallel one with respect to the other.

Further, where there may be a multiple of wires passing out from one end it is possible for a one or more of these wires to pass fully through a first or subsequent circuit board without electrical contact thereto so that there can be independent electrical contacts with respective electrical circuits.

In preference the electric machine is an electrical motor.

In preference in the alternative the electric machine is an electrical generator.

In preference in the alternative the electric machine is an electrical transformer.

In preference the electrical machine is a brushless generator or motor wherein the core is arranged to be a stator of the generator or motor.

In preference the elongate electrical conductor is in each case a wire having an enamel outer insulating coating.

In further form of the invention it may be said to reside in an electric motor having a stator which has a core of a soft magnetic composite material and where there are a plurality of bores passing through the core material and where there is for each of the bores a straight electrical conductor having an outer insulating coating passing fully through its respective bore with a close outer dimensional fit and there being at each end of the electrical conductor a bridging member which is for each respective end connected to other electric conductors.

It has also been established that while there is value in having a laminated core, the use of laminations can create significant difficulties in defining a construction technique. Laminations can have good efficiencies at supply line frequencies but with electronic speed control and higher frequencies it is not such a clear cut advantage.

Accordingly I have found that with this invention it is of significant advantage that the core can be an amorphous material which can therefore be handled and formed and machined according to conventional metal handling techniques. Especially it means that long bores can be drilled or be part of a pressing through such a core with a reasonable expectation that the sides of the bore therefore will be and remain relatively smooth and that enamel coated wires for instance which may then be inserted through these are not going to have engagement or snaring with burrs that may have been the case with a laminated bore.

The invention in a further form may be said to reside in a method of constructing an electric machine which includes the steps where at least two electrically insulated wires or other elongate conductors are each passed through a respective one of two bores which pass through a magnetically inducible core, and at least at one end thereof are connected together by a bridging member.

BRIEF DESCRIPTION OF THE DRAWINGS

For a better understanding of this invention it will now be described with reference to a preferred embodiment which shall be described herein with the assistance of the drawings wherein.

BEST MODE FOR CARRYING OUT THE INVENTION

Figure 1:
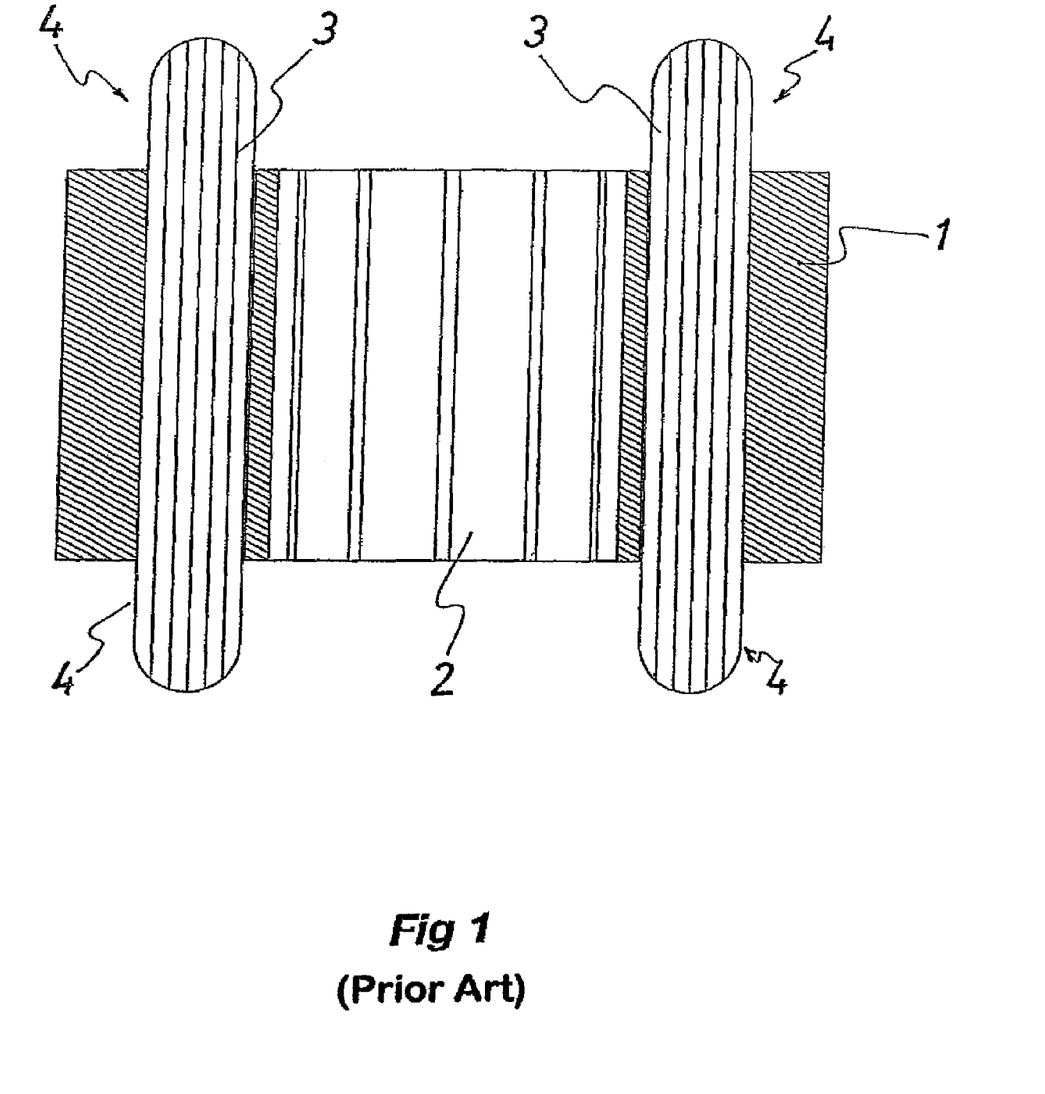
FIG. 1 is a cross-sectional view of an electrical machine of the prior art employing conventionally wound coils.

Now referring to illustrations and particular to FIG. 1 which is a cross-sectional view of an electrical machine offered in prior art. There is a stator core 1 surrounding a rotor cavity 2.

Wound around the stator core 1 in conventional fashion are coils of insulated copper wire. The winding of these coils results in a substantial part of the coil extending beyond the stator. These extents are end windings 4. These windings minimally contribute to the working of an electric machine.

Figure 2:
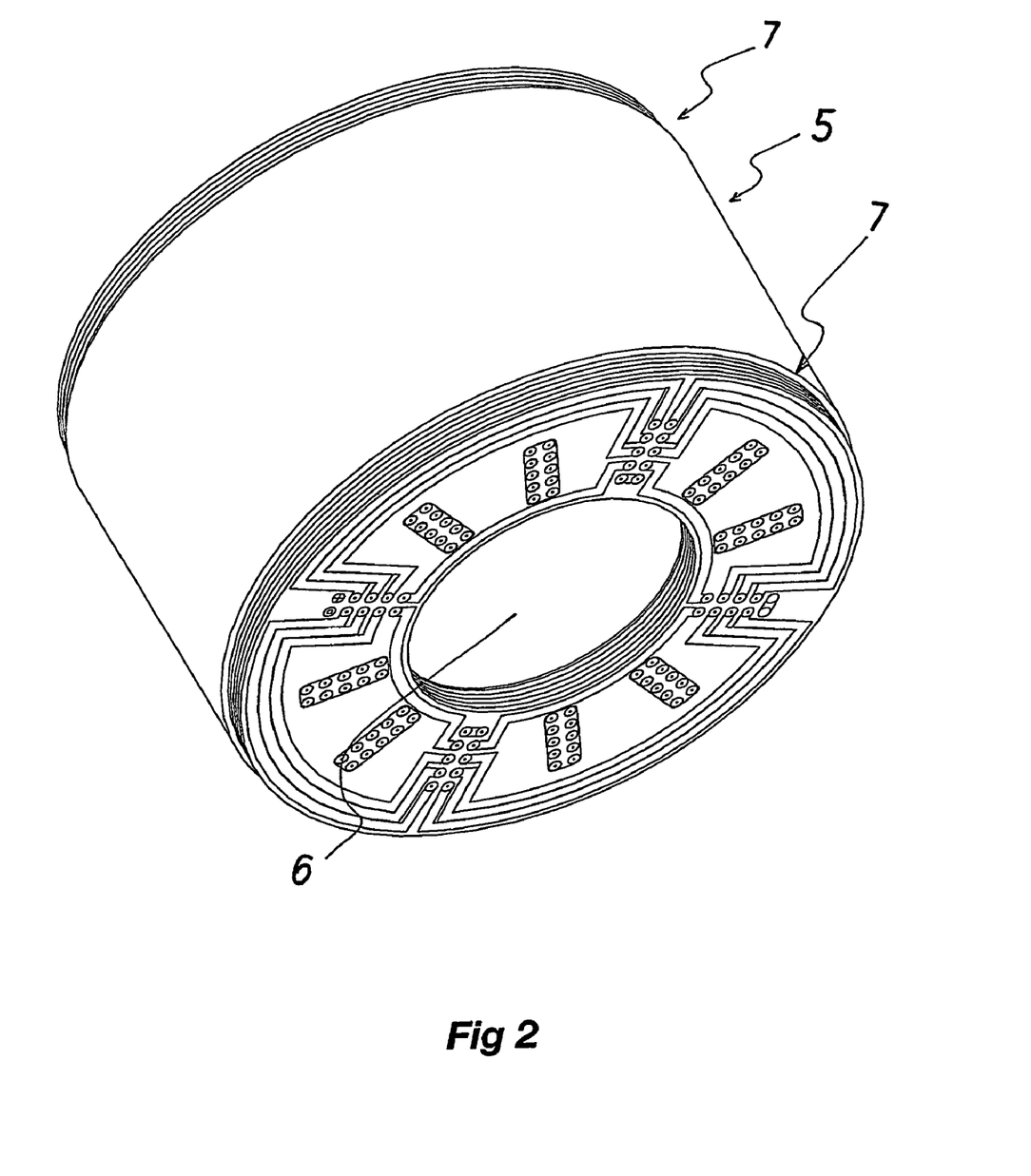
FIG. 2 is a perspective view of a stator of an electrical machine constructed according to a preferred embodiment of the present invention.

FIG. 2 shows a stator of an electric machine in accordance with an embodiment of this invention. There is provided a stator 5 in a form of an annular cylinder of soft magnetic composite material in this case somalloy. A rotor will fit into rotor cavity 3.

At each end of the stator 5 there is provided a stack of three printed circuit boards 7 which are each positioned to overly each other and to also be parallel to each other and which each act as bridging members to electrically complete an coil like arrangement through the stator 5. This stack of printed circuit boards 7 can be seen more clearly in FIG. 5.

Figure 3:
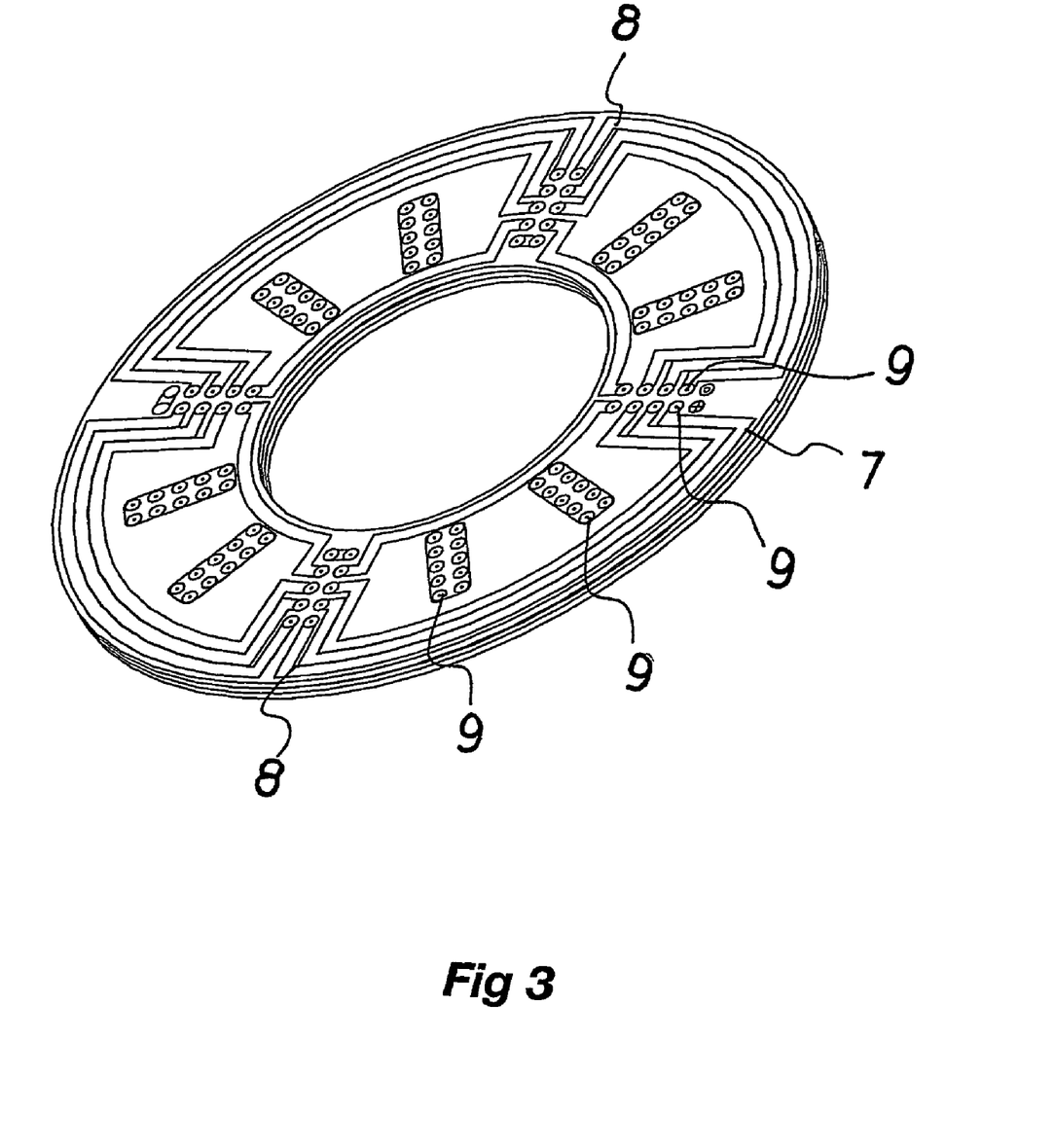
FIG. 3 is a perspective view of a circuit board according to a preferred embodiment of the present invention.

As can be seen in FIG. 3 each board has a series of tracks 8 printed thereon which selectively connect wire solder points 9. The stator 5 has a plurality of bores 13 drilled longitudinally and parallel one to the other through it in a pattern corresponding to the position of these wire solder points.

Each of these bores has an enamel insulated wire inserted therein. The diameter of the bore and the wires is such as to provide a loose sliding fit.

The wires are then selectively soldered and thereby electrically connected to one of the three printed circuit boards at one end and to a corresponding one of the three printed circuit boards at the other end.

As can be seen the top and bottom printed circuit boards are provided in pairs each pair forming one coil. In this case there are three coil sets which is the most common number of coils provided for a brushless DC electric motor. However it would be possible to provide more or less pairs of printed circuit boards in order to provide more or less coils.

Figure 5:
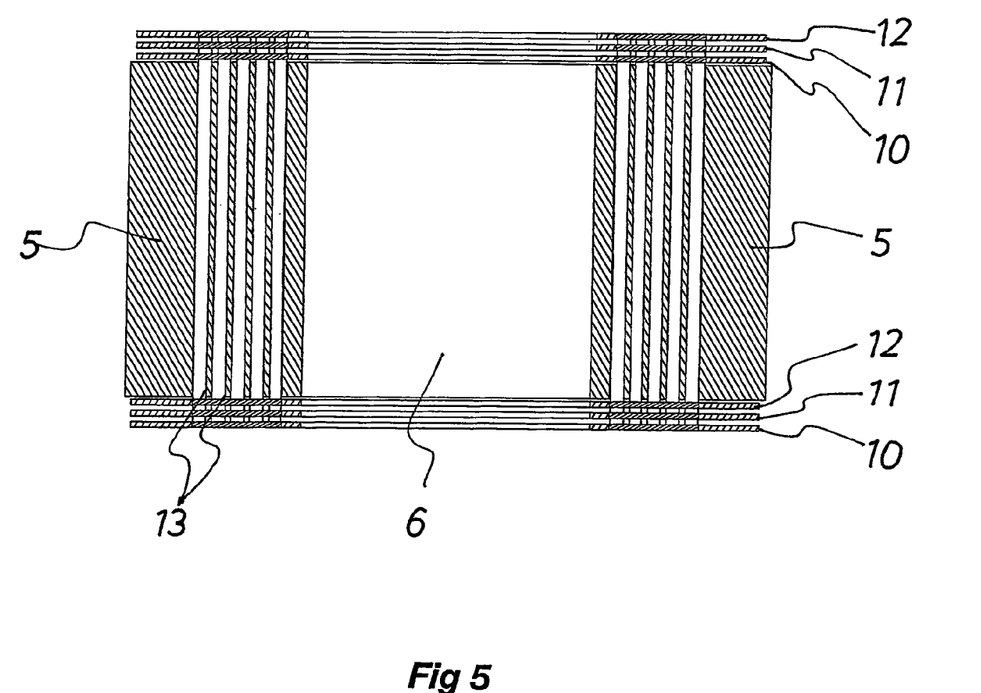
FIG. 5 is a cross-sectional view of the stator of FIG. 2.

This can most clearly be seen in FIG. 5 where the three pairs of printed circuit boards 10, 11 and 12 are shown. The wires are omitted for clarity but it is possible to see the bores 13 in which they are inserted.

Figure 4:
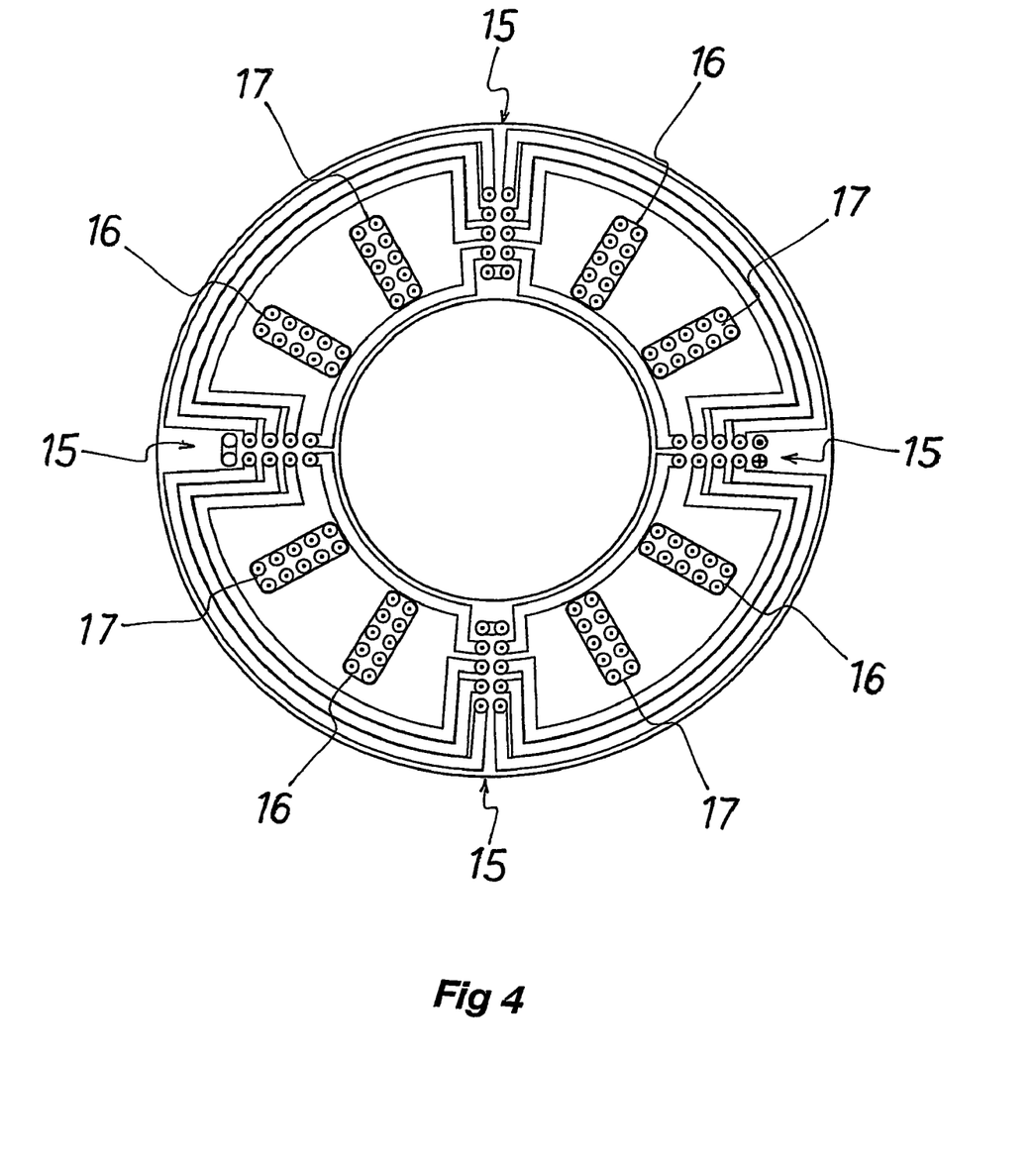
FIG. 4 is a perspective view of the circuit board of FIG. 2.

Referring to FIG. 4 it can be seen that there are groups of solder points 15 which are available to the connected by tracks on this printed circuit board. It can be also seen that there are two further groups of holes 16 and 17 through which the coil forming wires pass in order to arise at other of the printed circuit board for connection thereto.

Figure 6:
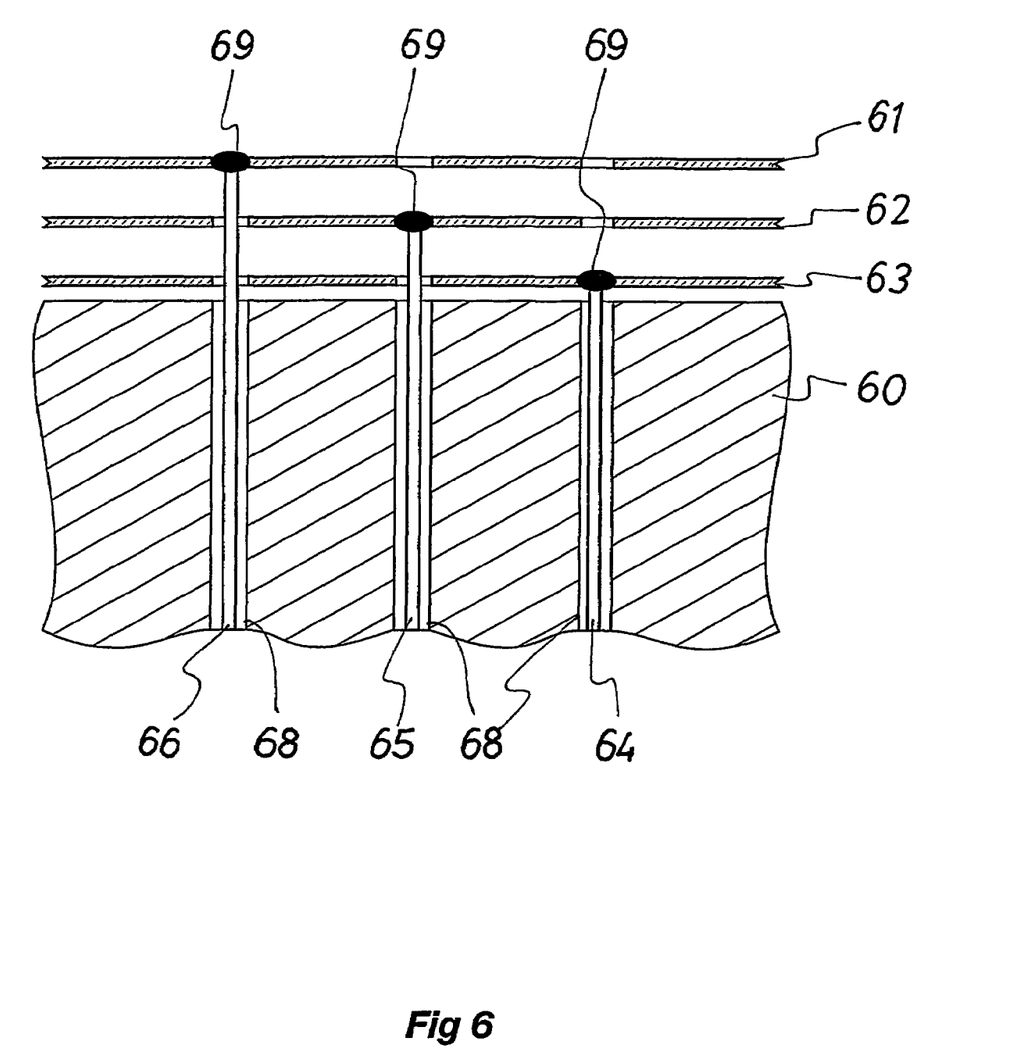
FIG. 6 is a fragmentary cross sectional view of the stator of FIG. 2, with the conductors shown.

The full set of three printed circuit boards provided at one end of the stator consists of three boards as shown in FIG. 4 rotationally offset by 120°. The connection of the conductors can be seen in FIG. 6. The stator 60 is pierced by a plurality of long, parallel bores 68. Three such are illustrated containing respective conductors 64, 65 and 66. These conductors emerge from the top of stator to meet three printed circuit boards 61, 62 and 63. Respective conductors are brought into electrical contact with conducting tracks on respective boards by solder joints 69. It can be seen that conductor 64 is connected to board 63, conductor 65 to board 62 and conductor 66 to board 61. This arrangement is repeated at the bottom of the stator, with three further printed circuit boards. Further connections (not shown) are made to further conductors such that each pair of bottom and top printed circuit boards (pairs of boards 10, 11 and 12 in FIG. 5) and associated conductors forms a continuous conducting path enclosing part of the stator material 60.

The result of this arrangement is that by using traditional electrical conductor joining techniques such as solder the manufacture of an electric machine can be somewhat more economical than has been the case hitherto and also with the arrangement of individual wires being separately located in individual bores allows a machine designer to allow for advantageous ratings in many cases that mean there can be very good economic advantages.

The purpose of this description is to describe the invention and not to limit this.

The invention claimed is:

1. An electric machine, comprising:
   a magnetically inducible core;
   a first plurality of printed circuit boards disposed at a first end of the magnetically inducible core, wherein each of the first plurality of printed circuit boards is substantially parallel with respect to each other and comprises a substantially similar circuit design;
   a second plurality of printed circuit boards disposed at a second end of the magnetically inducible core, wherein each of the second plurality of printed circuit boards is substantially parallel with respect to each other and comprises a substantially similar circuit design;
   a plurality of electrical current conductors, wherein each of the plurality of electrical current conductors extends through a respective bore within the magnetically inducible core such that the first plurality of printed circuit boards are electrically connected with the second plurality of circuit boards; and
   wherein each electrical current conductor is electrically insulated from the magnetically inducible core.

2. The machine of claim 1, wherein each of the first plurality of printed circuit boards is rotationally offset from each other by about 120 degrees.

3. The machine of claim 1, where each of the second plurality of printed circuit boards is rotationally offset from each other by about 120 degrees.

4. The machine of claim 1:
   wherein a first printed circuit board of the first plurality of printed circuit boards is electrically connected to a first printed circuit board of the second plurality of printed circuit boards;
   wherein a second printed circuit board of the first plurality of circuit boards is electrically connected to a second printed circuit board of the second plurality of printed circuit boards;
   wherein a third printed circuit board of the first plurality of circuit boards is electrically connected to a third printed circuit board of the second plurality of printed circuit boards.

5. The machine of claim 1, wherein the plurality of electrical current conductors form a single continuous electrically conductive path through the electric machine.

6. The machine of claim 1, wherein the plurality of electrical current conductors form multiple electrically conductive paths through the electric machine.

7. The machine of claim 6, wherein the multiple electrically conductive paths are electrically connected to a multiphase electrical power supply.

8. A method of manufacturing an electric machine, the method comprising:
   disposing a first plurality of printed circuit boards at a first end of a magnetically inducible core, the first plurality of printed circuit boards being substantially parallel with respect to each other and having substantially similar circuit design;
   disposing a second plurality of printed circuit boards at a second end of the magnetically inducible core, the second plurality of printed circuit boards being substantially parallel with respect to each other and having substantially similar circuit design;
   electrically connecting the first plurality of printed circuit boards to the second plurality of printed circuit boards with a plurality of electrical current connectors, each of the plurality of electrical current connectors being electrically insulated and extending through a respective bore within the magnetically inducible core.

\* \* \* \* \*